Feb. 21, 1956 DU BOIS EASTMAN 2,735,265
PROCESS AND APPARATUS FOR THE GENERATION
OF POWER FROM A SOLID CARBONACEOUS FUEL
Filed Sept. 28, 1954

INVENTOR.
du Bois Eastman
BY
ATTORNEYS

United States Patent Office 2,735,265
Patented Feb. 21, 1956

2,735,265

PROCESS AND APPARATUS FOR THE GENERATION OF POWER FROM A SOLID CARBONACEOUS FUEL du Bois Eastman, Whittier, Calif., assignor to The Texas Company, New York, N. Y., a corporation of Delaware Application September 28, 1954, Serial No. 458,891

21 Claims. (Cl. 60—39.05)

This invention relates to a process and apparatus for the generation of power from a solid carbonaceous fuel. In one of the more specific aspects of this invention, the potential energy of coal is converted to mechanical energy by dispersing crushed coal in water, heating the dispersion to convert the water to steam, separating the powdered coal from the steam, burning the powdered coal, and passing the hot combustion gases and steam through a gas turbine. The process of the present invention is particularly useful as applied to coal as the carbonaceous fuel. Lignite, anthracite, or bituminous coal is suitable as a fuel for the process of this invention.

This application is a continuation-in-part of both my co-pending applications, Serial No. 50,928, filed September 24, 1948, and my application Serial No. 200,427 filed December 12, 1950, both now abandoned.

An object of this invention is to provide an improved process and apparatus for the generation of power from solid carbonaceous fuels.

Another object is to provide an improved process for the production of power from coal.

A still further object is to provide a process for simultaneously pulverizing and preheating a solid fuel and generating steam to supplement hot gaseous products of combustion as a working fluid for generation of power.

Still another object is to provide an improved method of preparing and utilizing coal as a fuel for gas turbines.

In a co-pending application of du Bois Eastman and Leon P. Gaucher, Serial No. 49,626, filed September 16, 1948, now abandoned in favor of a continuing application Serial No. 490,214, filed February 24, 1955, a novel process for handling particles of carbonaceous solids is disclosed. In accordance with the method disclosed in said last mentioned application, particles of a solid carbonaceous material, particularly coal, are admixed with a liquid to form a slurry or fluid suspension and the suspension passed as a confined stream in turbulent flow through a heating zone. The slurry is heated in the heating zone to an elevated temperature sufficient to vaporize the liquid and form a dispersion of solid particles in the resulting stream of vapors. Heating of particles of coal under these conditions results in rapid disintegration of the particles to powder. This method offers a convenient and efficient means for feeding solid particles in controlled amounts to processes operating under pressure, and, at the same time, heating and pulverizing the particles.

In accordance with the present invention, this novel step of heating and pulverizing solid carbonaceous material is employed for the preparation of fuel for the generation of gas at elevated pressure to drive a turbine of the hot gas type. Vapor such as steam is also generated simultaneously in the heating step; this steam may serve the dual purpose of tempering the temperature of the hot gases and supplementing the working fluid supplied to the turbine. Such gas turbines are well known in the art and have found numerous applications in various fields.

Coal-fired gas turbines have already been developed and used successfully. In accordance with the usual practice, very finely divided powdered coal has been admixed with air under pressure and burned in a suitable combustion chamber. The temperature required for efficient combustion in the combustion chamber is in excess of the permissible temperature for operation of a gas turbine. Accordingly, additional compressed air or recirculated exhaust gas is admixed with hot gases from the combustion chamber to reduce the temperature of the mixture of hot gases to a permissible temperature. Permissible gas turbine inlet temperatures at the present time range from about 900 to about 1400 F. Obviously, no net work is obtained from either the excess air or recirculated gas; both methods of temperature control actually result in a net loss of energy. By means of the present invention, temperature control is no problem; cooling of the hot combustion gases is utilized to produce additional working fluid for the turbine.

It is desirable to operate the hot gas generator or combustion chamber at a pressure as high as practical to provided gases at elevated pressure for operation of the turbine. While gas turbines have been operated with inlet pressures as low as about 30 pounds per square inch absolute, higher pressures on the order of 60 to 90 pounds per square inch absolute are desirable. The problem of feeding powdered coal under pressure to the combustion zone has been very difficult of solution even at the lower pressures. Numerous devices have been proposed for injecting powdered coal into a compressed gas stream in regulated amounts as required for operation of the gas turbine, but all are subject to serious disadvantages.

The present invention provides a means for supplying coal to a combustion chamber at any desired pressure without undue mechanical difficulty. This is accomplished by application of the above-mentioned process for pulverizing and feeding solid fuel under pressure. In accordance with a specified embodiment of the process of this invention, a fluid suspension or slurry of coal particles in a vaporizable liquid such as water is pumped under pressure through a heating zone as a confined stream in turbulent flow wherein it is heated to a temperature at least sufficient to convert the water to steam. The heating step serves to generate steam, to preheat the coal, and, at the same time, to reduce the particle size of the coal, and to form a dispersion of powdered coal in steam. The resulting dispersion of powdered coal in steam at an elevated temperature is discharged from the heating zone and passed to a combustion zone wherein it is admixed with compressed preheated air for combustion. If desired, at least part of the steam may be separated from the dispersion before it enters the combustion zone. The combustion products are utilized as working fluid for a gas turbine. The combustion zone may be of a conventional type suitable for use with gas turbines as is well known in the art. Residual solid particles of ash and any unburned particles of coal are separated from the hot gas stream prior to admission to the turbine.

Complete combustion of the coal is usually carried out in the combustion zone. However, the combustion zone may be operated to produce a mixture of carbon monoxide and hydrogen suitable as fuel gas or as a source of feed gas for the synthesis of ammonia or hydrocarbons. In the latter event, it may be desirable to substitute oxygen-enriched air or relatively pure oxygen for part or all of the air.

Heat from the combustion zone and from the exhaust gas from the turbine may be used to supply heat for heating and disintegrating the coal in accordance with this invention.

The liquid used for preparation of the suspension should be one which is innocuous with respect to the equipment and the combustion reaction. Suitable vaporizable liquids include water and normally liquid hydrocarbons. Hydrocarbon oils may be used in conjunction with water for forming the slurry with the powdered coal. Suitable hydrocarbon oils include gasoline, kerosene, naphtha, and gas oil fractions of petroleum distillates, light oil, middle oil, or heavy oil fractions of coal distillates; individual components from petroleum or coal distillates, asphalt, residual liquid fractions from crude oil, tar, and various mixtures of the above materials. Water and oil mixtures, suitably in the form of emulsions, may be used in preparing the suspension. Emulsifying agents may be used as an aid in the preparation of an emulsion. For simplicity the following description will refer to water as the liquid and steam as the vapor, but it is to be understood that the above and other vaporizable liquids may be used instead.

In a preferred embodiment of this invention, coal in particle form, is admixed with sufficient water to form a fluid suspension or slurry. The suspension is passed as a stream in turbulent flow through a tubular heater in heat exchange with exhaust gases from a gas turbine. If desired, it may then also be passed in heat exchange with hot gases from the combustion zone. The slurry thus is heated to a temperature at least sufficient to convert the water to steam. Combined water need not be completely removed from the coal.

The heating step produces a gasiform dispersion of powdered coal in steam which may be passed directly to a combustion zone in admixture with compressed air. Alternatively, the gasiform dispersion is passed to a cyclone separator wherein at least a portion of the steam is separated from the dispersion. From about 80 to about 90 per cent of the steam in the dispersion may be separated therefrom substantially free from solid particles by means of a cyclone separator.

The pulverized coal passed into the combustion zone in admixture with compressed air is burned to generate hot gases. The hot gases resulting from combustion under efficient combustion conditions may be too hot for use directly in a gas turbine. By passing these gases in heat exchange with the feed stream, the temperature of the gases is reduced and steam is generated for pulverization of the coal and as a working fluid for the gas turbine. After separation of residual solid from the hot gas stream, it is passed into a gas turbine, together with steam generated from the slurry. Exhaust gases from the turbine supply heat for heating of the slurry.

A portion of the powdered carbonaceous material resulting from the disintegration in the heating step may be separated from the gases or vapors and returned for use in making up the feed suspension. This powdered material, because of its state of subdivision, aids in producing a uniform suspension and reduces the quantity of liquid required to form a pumpable fluid suspension.

The quantity of liquid admixed with the coal to form the suspension may vary considerably depending upon the composition of the coal and the type of liquid used. A minimum of about 35 per cent liquid by weight based on the weight of the mixture is required to form a fluid suspension with water. Generally, about equal parts of coal and water by weight are desirable in the slurry. The liquid content of the suspension may be controlled by first mixing the solid with a quantity of liquid in excess of the required quantity and adjusting the consistency to the desired value by removal of excess liquid in a conventional thickener. The suspension is readily pumped with suitable equipment, e. g., with a piston pump of the type commonly used for handling similar suspensions of solids. The suspension may be made up at a point some distance away from the processing site and pumped to the site in a pipeline.

Anthracite silt may advantageously be used as a feed material for the present process. Anthracite silt is a term applied to the fine particles of coal and associated impurities, obtained as a by-product in the mining, handling, and sizing of the anthracite coal. Anthracite silt may be used in the present process without preliminary grinding. It ranges in size from about $3/16$ inch average diameter, to about 200 mesh, the bulk of the material falling within the range of $3/32$ inch to 100 mesh.

The size of the coal particles fed to the heating step is not of especial importance to the successful operation of the invention. Particles of a size which may be passed through the heater tubes without difficulty may be used, i. e., particles having an effective diameter less than one-third the pipe diameter. Generally, it is preferable to use particles less than about one-quarter inch in average diameter. Since the heating of the dispersion under turbulent flow conditions results in disintegration of the coal, costly pulverization by mechanical means is eliminated. It is contemplated in most applications of this process that the coal will be reduced only to a particle size such that it may be readily handled as a suspension or slurry. The coal may be crushed mechanically to a particle size ranging from about one-fourth inch in average diameter to 100 mesh with a relatively small expenditure of power. Further mechanical reduction in size becomes progressively more expensive, pulverization requiring large expenditures of power. It is evident that this process possesses important advantages over conventional methods which involve separate pulverization and carbonization.

The linear velocity of a liquid suspension at the inlet to the heating coil should be within the range of from about ½ foot to about 10 feet per second, suitably about 1 to 2 feet per second. The velocity of the vapor dispersion, as at the outlet of the heater, should be within the range of from about 25 to about 200 feet per second, suitably about 50 to 100 feet per second. Higher velocities may be employed.

The temperature at the outlet of the heating coil may range from about 250 to 1000° F. or higher. The temperature should be at least sufficient to insure substantially complete vaporization of water present in the dispersion by the time it is discharged from the heating zone. Preferably a temperature within the range of 300 to 600° F. is attained at the outlet of the heater. The higher temperatures, within practical limits, are usually advantageous.

Pressure, in itself, is not critical in the heating step. The temperature and pressure relationships affecting vaporization are well known. It is desirable to operate the heating zone at a pressure somewhat higher than the operating pressure of the combustion zone and turbine. The pressure at which the combustion zone operates generally will not exceed 75 pounds per square inch absolute and the pressure at the inlet to the turbine will be slightly less. The heating and pulverizing step may be operated at a corresponding pressure sufficient to insure flow through the tubular heating coils and into the combustion zone at the desired rate. It is desirable that the slurry and dispersion pass through a long path of flow as a confined stream in highly turbulent flow. Consequently, a considerable pressure drop takes place in the tubular heater due to resistance to flow. This drop may be on the order of, for example, 100 to 200 pounds per square inch. The pressure at the inlet to the tubular heater may be from about 150 to about 600 pounds per square inch.

A number of advantages are obtained by this method of operation. Pulverization and preheating of the coal is accomplished in a single step. This eliminates costly pulverization by mechanical means and costly equipment for feeding the coal to the system at the desired operating pressure. When dispersed in a liquid to form a slurry, the coal may be readily transported through pipelines and subjected to elevated pressure by pumps. For mobile generators, for example, for use on a railroad locomotive, the fuel may be carried as a slurry which is kept in suspension by agitation. Another advantage of the present process results from the fact that as a dispersion or slurry, the quantity of coal fed to the gas generator or combustion zone may be very accurately metered. This permits flexibility in the operation of the turbine, which is often desirable.

The invention will be more readily understood from the following detailed description and the accompanying drawing. In the detailed description of illustrative operations involving the present invention, coal is taken as a preferred fuel and water as a preferred liquid for forming the dispersion.

Figure 1:
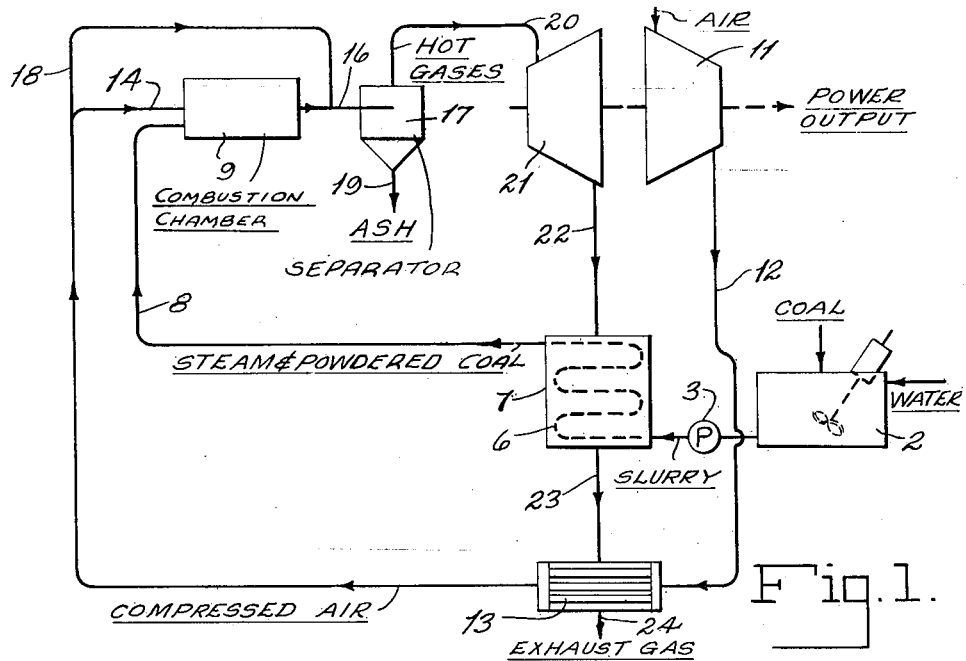
Figure 1 is a diagrammatic view illustrating in simplified form one mode of application of the present invention.

With reference to Figure 1, a suspension of crushed coal in water is made up in a mixing tank 2. The suspension of coal particles in water is subjected to elevated pressure by pump 3 and passed as a confined stream in turbulent flow through a heating coil 6 in a heat exchanger 7. The heating coil is of relatively small cross-sectional area to insure the desired velocity of flow of the suspension therethrough. The dispersion of powdered coal and steam resulting from passage of the suspension through the heating coil is passed through line 8 to a combustion zone 9 operated at an elevated pressure wherein it is admixed with compressed air and the combustible constituents burned to generate hot gases. Air for combustion is compressed by an air compressor 11, preferably of the axial flow type, and passed through line 12 to a preheater 13 wherein it is heated to an elevated temperature. Heated compressed air is supplied to the combustion zone through line 14.

Hot products of combustion and steam from the combustion zone are discharged through line 16 into a cyclone separator 17. An additional quantity of compressed air by-passes the combustion zone through line 18 and is admixed with the hot combustion gases in line 16. This reduces the temperature of the hot gases to the desired level. Fly ash and unburned particles of coal are separated from the gas stream in the cyclone separator and discarded through line 19. Improved separation of ash from the gas stream in the cyclone separator may be obtained by discharging from about 5 to 20 per cent of the gas with the ash. The hot gases, free from solid particles and at a suitable elevated temperature and pressure, pass through line 20 to a gas turbine 21 as the working fluid for said turbine. The turbine 21 drives the air compressor 11 and delivers additional mechanical energy as power output from the system.

The exhaust gases from the turbine are discharged through line 22 to the heat exchanger 7 to supply heat to the heating coil 6 for vaporization of the water and preheating of the coal. From the heat exchanger 7, the exhaust gases pass through line 23 to preheater 13 wherein they supply heat to the compressed air by indirect heat exchange. The exhaust gases are discharged through line 24.

As an illustrative example of a typical operation of the present process, finely crushed coal is admixed with water to form a slurry containing about 55 weight per cent coal. The slurry is passed at 210 pounds per square inch gauge into a heating coil wherein it is heated to 400° F. by heat exchange with hot gases from a gas turbine. The resulting dispersion of powdered coal and steam is discharged from the coil at 75 pounds per square inch absolute, admixed with preheated compressed air and burned at this pressure. Sufficient additional air is admixed with the combustion products and steam to reduce their temperature to 1350° F. After removal of finely divided solid particles in a cyclone separator the hot gases at 1345° F. and 73.5 pounds per square inch absolute are passed into a gas turbine. The gas turbine drives an air compressor to supply air for the combustion zone and for the dilution of the hot combustion gases. About two-thirds of the power output of the turbine is required for air compression. The exhaust gas from the turbine at 875° F. is passed into heat exchange with the slurry of coal and water, supplying heat for the generation of steam and preheating of the coal. Exhaust gases are discharged from the heater at about 825° F. and further used for preheating the compressed air.

Figure 2:
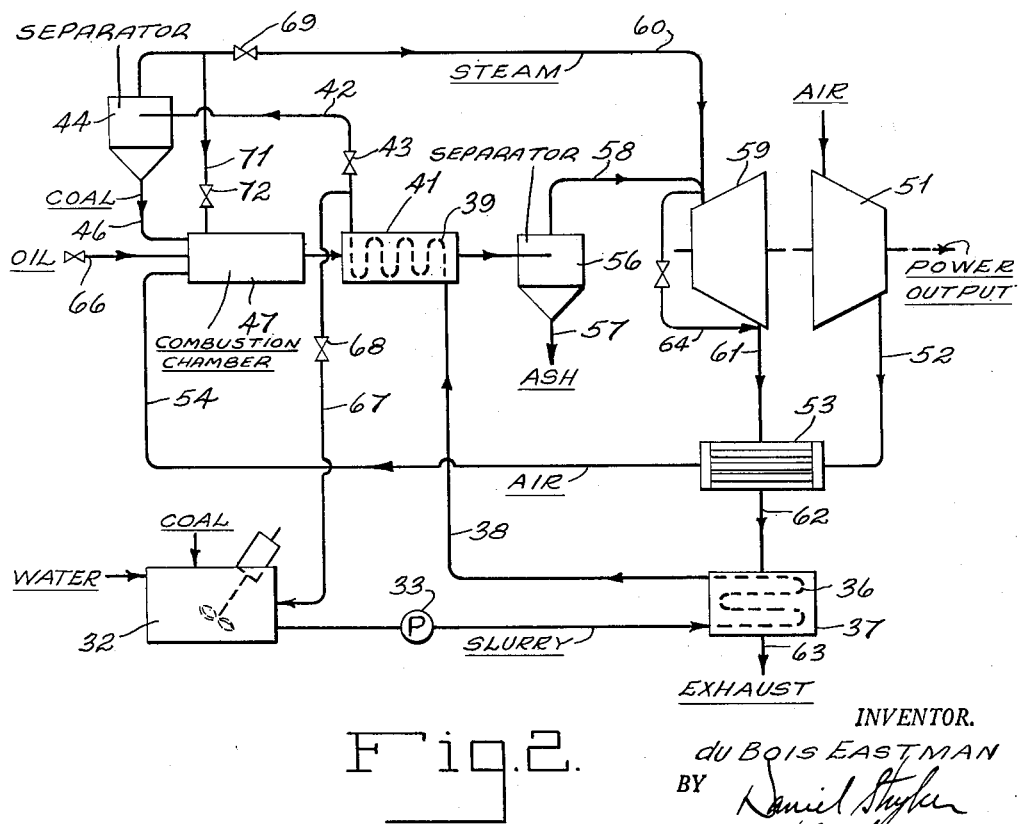
Figure 2 is a diagrammatic view in simplified form of a preferred modification of the present invention.

With reference to Figure 2, a suspension of crushed coal in water is made up in mixing tank 32. The suspension or slurry of coal particles in water is subjected to elevated pressure by pump 33 and passed as a confined stream in turbulent flow through a tubular heater in the form of a heating coil 36 in heat exchanger 37. The heating coil is of relatively small cross-sectional area to insure turbulent flow of the suspension therethrough. From coil 36 the slurry passes through line 38 to a second section of the tubular heater in the form of a heating coil 39 disposed in a housing 41. In the heating coils, water in the slurry is converted to steam and at the same time the particle size of the coal is reduced, forming a dispersion of powdered coal in steam. The slurry and dispersion pass as a confined stream in highly turbulent flow along an elongated path of flow, preferably on the order of at least 1000 times the diameter of the flow path. The resulting dispersion is passed through line 42, as controlled by valve 43, into a cyclone separator 44 wherein at least a portion of the steam is separated from the powdered coal.

Preferably some steam is permitted to remain in admixture with the powdered coal from the separator as a carrier for the coal. This steam also helps control the temperature in the subsequent combustion step. Also, as pointed out hereinabove, a relatively complete separation of powdered coal from steam may be made in a cyclone separator if the steam separated from the dispersion is limited to from about 80 to 90 per cent of the steam in the dispersion. The remaining steam may be fed with the powdered coal to the combustion zone or additional separation of steam may be accomplished, if so desired.

The powdered coal is passed through line 46 into a combustion zone 47, operating at an elevated pressure, where it is mixed with compressed air and burned to generate hot combustion products. The line 46 may, if desired, comprise an elongated tubular passage through which the coal and a portion of the steam resulting from vaporization of the slurry is passed at a relatively high velocity to effect additional pulverization of the coal.

Air for combustion is compressed by an air compressor 51, preferably of the axial flow type, and passed through line 52 to a preheater 53 wherein it is heated to an elevated temperature. Heated compressed air is supplied to the combustion zone through line 54.

Hot products of combustion and steam from the combustion zone are discharged into heater 41 and then into a cyclone separator 56. In the heater 41 the temperature of the hot combustion products and steam is reduced and, at the same time, steam is generated for pulverization and preheating of the coal to provide working fluid for the turbine, as brought out hereinabove. Fly ash and unburned particles of coal are separated from the gas stream in a cyclone separator 56 and discarded through line 57. The hot products of combustion free from solid particles and at an elevated temperature and pressure, pass through line 58 into a gas turbine 59 as working fluid for the turbine.

Steam separated from the dispersion in cyclone separator 44 passes through line 60 into admixture with the hot products of combustion from line 58 and into turbine 59. This steam tempers the temperature of the hot products of combustion and supplies additional working fluid to the turbine. The turbine 59 drives the air compressor 51 and in addition delivers mechanical energy as power output from the system.

The exhaust gases from the turbine are discharged through line 61 to preheater 53 wherein they supply heat to the compressed air by indirect heat exchange. From the preheater 53 the exhaust gases pass through line 62 to the heat exchanger 37 to supply heat to the heating coil 36 for preheating the slurry. The exhaust gases are discharged through line 63.

Oil may be supplied to the combustion zone 47 through line 66. Normally, it is desirable to supply oil as fuel only during the starting period to bring the system up to operating temperature, or during a stand-by period. During the start-up period air may be supplied from an auxiliary source or the air compressor 51 may be operated by an auxiliary motor not illustrated in the figure. During the start-up period it is desirable to circulate water or slurry through heating coils 36 and 39. While the system is coming up to operating temperature or during a stand-by period, the material discharged from coil 39 may be by-passed through line 67 to the mixing tank 32 for recirculation, as controlled by valve 68. When vaporization of the water in the slurry is complete, valve 68 may be closed and valve 43 opened to permit the dispersion to pass through line 42 to separator 44, as described hereinabove. Provision may be made for by-passing gases from the inlet to the outlet of the turbine through a by-pass 64.

The rate of steam withdrawal from separator 44 and, consequently, the extent of separation of steam from the dispersion, may be regulated by valve 69 in steam line 69. Steam, in addition to that supplied to the combustion zone through line 46, may be admitted to the combustion zone through line 71 as controlled by valve 72. This may be desirable for temperature control within the combustion zone, or for cooling the burner. Steam may also be used for preheating slurry or for other heating purposes as will be apparent to those skilled in the art.

It will be appreciated that in the interest of simplicity, various control valves and other auxiliary equipment have been omitted from the diagrammatic views of Figures 1 and 2.

Obviously, many modifications and variations of the invention, as hereinbefore set forth, may be made without departing from the spirit and scope thereof and, therefore, only such limitations should be imposed as are indicated in the appended claims.

I claim:

1. In a process for the generation of power from a solid carbonaceous material wherein said material is subjected to combustion at a superatmospheric pressure and resulting hot products of combustion used as working fluid in a gas turbine, the improvement which comprises forming a fluid suspension of particles of solid carbonaceous material in a vaporizable liquid, passing the suspension at an elevated pressure to a heating coil as a confined stream in turbulent flow wherein it is heated to a temperature at least sufficient to vaporize the liquid and form a dispersion of solid carbonaceous material in a vapor, subjecting said dispersion to combustion at superatmospheric pressure, and passing resulting hot gases from said combustion zone to a gas turbine as working fluid for said turbine.

2. In a process for the generation of power from a solid carbonaceous fuel wherein said fuel is subjected to combustion at a superatmospheric pressure and resulting hot products of combustion used as working fluid in a gas turbine, the improvement which comprises forming a fluid suspension of relatively coarse particles of solid carbonaceous fuel in a vaporizable liquid, passing the suspension at an elevated pressure between 150 and 600 pounds per square inch to a heating zone, passing said stream through said zone as a confined stream in turbulent flow while heating said stream to an elevated temperature between 250 and 1000 degrees F. at least sufficient to vaporize the liquid and form a dispersion of heated particles of solid carbonaceous material of reduced particle size in a vapor flowing at a velocity in excess of 25 feet per second, subjecting said heated particles to combustion at superatmospheric pressure in a combustion zone, and passing resulting hot gases from said combustion zone to a gas turbine as working fluid for said turbine.

3. A process as defined in claim 2 wherein said liquid comprises liquid hydrocarbon.

4. In a process for the generation of power from a solid carbonaceous fuel wherein said fuel is subjected to combustion at a superatmospheric pressure and the resulting hot products of combustion used as working fluid in a gas turbine, the improvement in generating said working fluid under pressure which comprises forming a fluid suspension of particles of solid carbonaceous material in water, wherein said particles have an average diameter between 3/16 inch and 200 mesh, passing said suspension at an elevated pressure between 150 and 600 pounds per square inch to a heating zone, passing said stream through said zone as a confined stream in turbulent flow while heating said stream to a temperature between 250 and 1000 degrees F. at least sufficient to vaporize all of the water and form a dispersion in steam of fuel particles of smaller size than the particles in said original suspension flowing at a velocity in excess of 25 feet per second as a confined stream in highly turbulent flow, passing said heated dispersion to a combustion zone and subjecting said fuel in said dispersion to combustion at superatmospheric pressure to form a mixture of hot products of combustion and superheated steam as said working fluid, and passing said working fluid to said turbine.

5. In a process for the generation of power from a solid carbonaceous fuel wherein said fuel is subjected to combustion at a superatmospheric pressure and resulting hot products of combustion used as working fluid in a gas turbine, the improvement which comprises forming a fluid suspension of particles of solid carbonaceous fuel in a vaporizable liquid, passing the suspension at an elevated pressure to a heating zone as a confined stream in turbulent flow, heating said stream to an elevated temperature at least sufficient to vaporize the liquid and form a dispersion of heated particles of solid carbonaceous material of reduced particle size in a vapor, subjecting said heated particles to combustion at superatmospheric pressure in a combustion zone, passing resulting hot gases from said combustion zone to a gas turbine as working fluid for said turbine, and passing hot exhaust gases from said turbine in heat exchange relationship with said suspension in said heating zone.

6. A process as defined in claim 5, also comprising the steps of passing a stream of combustion air into said combustion zone for reaction with said particles, and passing hot exhaust gases from said turbine in heat exchange relationship with said stream of combustion air ahead of said combustion zone.

7. A process in accordance with claim 6, also comprising employing the energy of said turbine to compress said air.

8. In a process for the generation of power from a solid carbonaceous fuel wherein said fuel is subjected to combustion at a superatmospheric pressure and resulting hot products of combustion used as working fluid in a gas turbine, the improvement which comprises forming a fluid suspension of particles of solid carbonaceous fuel in a vaporizable liquid, passing the suspension at an elevated pressure to a heating zone as a confined stream in turbulent flow, heating said stream to an elevated temperature at least sufficient to vaporize the liquid and form a dispersion of solid carbonaceous material of reduced particle size in a vapor, subjecting said heated dispersion to combustion at superatmospheric pressure in a combustion zone, passing a stream of compressed air into said combustion zone for reaction with said dispersion, passing resulting hot gases from said combustion zone to a gas turbine as working fluid for said turbine, passing a second stream of relatively cool compressed air into the hot gases formed in said combustion zone after leaving said zone and before entering said turbine, to lower the temperature of said gases to the permissible operating temperature of said turbine, and passing hot exhaust gases from said turbine in heat exchange relationship with said suspension in said heating zone.

9. In a process for the generation of power from a solid carbonaceous fuel wherein said fuel is subjected to combustion at a superatmospheric pressure and resulting hot products of combustion used as working fluid in a gas turbine, the improvement which comprises forming a fluid suspension of particles of solid carbonaceous fuel in water, passing the suspension at an elevated pressure to a tubular heater as a confined stream in turbulent flow wherein it is heated to a temperature at least sufficient to vaporize the water and form a dispersion of solid carbonaceous fuel in steam, separating steam from said dispersion, subjecting said solid carbonaceous fuel from said dispersion to combustion at superatmospheric pressure, and passing resulting hot gases from said combustion zone in admixture with said steam to a gas turbine as working fluid for said turbine.

10. A process for the preparation of working fluid for an engine from a solid carbonaceous fuel which comprises admixing particles of said solid carbonaceous fuel with sufficient water to form a liquid suspension, passing a continuous stream of said suspension at an elevated pressure to a heating zone, forming a dispersion by vaporizing water from said stream of suspension in said heating zone thereby forming a continuous stream of solid carbonaceous fuel dispersed in steam at an elevated pressure, pulverizing said particles by conducting said dispersion as a confined stream in turbulent flow, separating steam from the dispersion at elevated pressure, and subjecting said carbonaceous fuel separated from said dispersion to combustion at elevated pressure thereby forming said working fluid.

11. A process for the preparation of working fluid for an engine from a solid carbonaceous fuel which comprises admixing particles of said solid carbonaceous fuel with sufficient water to form a liquid suspension, passing a continuous stream of said suspension at an elevated pressure to a heating zone, forming a dispersion by vaporizing water from said stream of suspension in said heating zone thereby forming a continuous stream of solid carbonaceous fuel dispersed in steam at an elevated pressure, pulverizing said particles by conducting said dispersion as a confined stream in turbulent flow, separating steam from the dispersion at elevated pressure, subjecting said carbonaceous fuel separated from said dispersion to combustion at elevated pressure, and admixing the resulting hot gases from said combustion with the separated steam to form said working fluid.

12. A process as defined in claim 11 also comprising passing said working fluid to such an engine, and passing exhaust gases from the engine in heat exchange with said liquid suspension in said heating zone as a source of heat therefor.

13. A process as defined in claim 11 wherein heat released in the combustion of said fuel supplies at least part of the heat required for vaporization of water from said suspension.

14. A process for the preparation of working fluid for an engine from a solid carbonaceous fuel which comprises admixing particles of said solid carbonaceous fuel with sufficient water to form a liquid suspension, passing a continuous stream of said suspension at an elevated pressure to a heating zone, forming a dispersion by vaporizing water from said stream of suspension in said heating zone thereby forming a continuous stream of solid carbonaceous fuel dispersed in steam at an elevated pressure, pulverizing said particles by conducting said dispersion as a confined stream in turbulent flow, separating a portion of the steam from the dispersion, subjecting the fuel in admixture with the remaining steam to combustion at elevated pressure, and admixing the resulting hot gases from said combustion with the separated steam to form said working fluid.

15. A process as defined in claim 14 wherein said steam separated from said dispersion is not more than about 80 per cent of the steam present in said dispersion.

16. A process for preparing working fluid for an engine from a solid carbonaceous fuel which comprises mixing particles of said solid carbonaceous fuel with sufficient liquid water to form a liquid suspension, passing a continuous stream of said carbonaceous fuel in suspension in said water at an elevated pressure to a heating zone, vaporizing water from said stream of suspension in said heating zone thereby forming a continuous stream of solid carbonaceous fuel as a dispersion in vaporized water at an elevated pressure, pulverizing said particles by conducting said dispersion as a confined stream in turbulent flow, subjecting said carbonaceous fuel to combustion at elevated pressure thereby forming said working fluid, and passing said working fluid in heat exchange relation with said stream of carbonaceous fuel particles for heating said water and fuel and cooling said working fluid.

17. Power generating apparatus comprising, in combination a gas turbine; a gas generating furnace connected to said turbine; means for supplying combustion supporting fluid to said furnace; means for preparing a fluid suspension of particles of a carbonaceous fuel in a vaporizable liquid; an elongated tube having diameter at least three times the diameter of the largest of said particles, said tube having an entrance connected to said last-named means and an exit connected to said furnace; and means for heating said tube to a high temperature to vaporize said liquid during passage through said tube and form a flowing dispersion in vapor of disintegrated particles of said carbonaceous material, said last-named means comprising means for passing hot exhaust gases from said turbine in heat exchange relationship with said tube.

18. Power generating apparatus comprising, in combination a gas turbine; a gas generating furnace connected to said turbine; means for supplying combustion supporting fluid to said furnace; means for preparing a fluid suspension of particles of a carbonaceous fuel in a vaporizable liquid; an elongated tube having diameter at least three times the diameter of the largest of said particles, said tube having an entrance connected to said last-named means and an exit connected to said furnace; and means for heating said tube to a high temperature to vaporize said liquid during passage through said tube and form a flowing dispersion in vapor of disintegrated particles of said carbonaceous material, said last-named means comprising means for passing hot exhaust gases from said turbine in heat exchange relationship with said tube; and means for passing hot exhaust gases from said turbine in heat exchange relationship with said combustion supporting fluid ahead of said furnace.

19. Apparatus in accordance with claim 18 wherein said means for supplying combustion supporting fluid includes an air compressor driven by said turbine.

20. Power generating apparatus comprising, in combination, a gas turbine; a gas generating combustion zone; means for supplying combustion supporting fluid to said combustion zone; means for preparing a fluid suspension of particles of a solid carbonaceous fuel in a vaporizable liquid; a vapor separator; an elongated pulverization tube having an entrance connected to said last named means and an exit connected to said vapor separator; means for heating said suspension in said pulverization tube to a high temperature to vaporize said liquid during passage thereof through said tube thereby forming a turbulently flowing dispersion of fine particles of said carbonaceous material in vapor; a first conduit connecting said vapor separator to said combustion zone for supplying particles of carbonaceous material thereto for combustion therein to generate working fluid for said turbine; a second conduit connecting said combustion zone to said gas turbine for supplying said working fluid thereto; and a third conduit connecting said vapor separator to said turbine for supplying separated vapor thereto concurrently with said working fluid for tempering said working fluid.

21. Power generating apparatus comprising, in combination, a gas turbine; a gas generating combustion zone; means for supplying combustion supporting fluid to said combustion zone; means for preparing a fluid suspension of particles of a solid carbonaceous fuel in a vaporizable liquid; an elongated pulverizing conduit having an entrance connected to said last named means and an exit connected to said combustion zone for supplying particles of carbonaceous material thereto for combustion therein to generate working fluid for said turbine; and means for heating said suspension in said pulverization tube to a high temperature to vaporize said liquid during passage thereof through said tube thereby forming a turbulently flowing dispersion of fine particles of said carbonaceous material in vapor, said last named means comprising conduit means for conducting said hot working fluid from said combustion zone in heat exchange relationship with said elongated conduit to heat said suspension, and then to said turbine as working fluid therefor.

References Cited in the file of this patent

UNITED STATES PATENTS

| | | |
|---|---|---|
| 684,746 | Chapman | Oct. 15, 1901 |
| 1,197,456 | Dinsmore | Sept. 5, 1916 |
| 1,298,430 | Wondra | Mar. 25, 1919 |
| 1,329,967 | Greenstreet | Feb. 3, 1920 |
| 1,608,699 | Kreisinger et al. | Nov. 30, 1926 |
| 1,809,819 | Caller | June 16, 1931 |
| 1,897,478 | Holzwarth | Feb. 14, 1933 |
| 2,032,402 | Colby et al. | Mar. 3, 1936 |
| 2,055,385 | Noack | Sept. 22, 1936 |
| 2,066,418 | O'Mara | Jan. 5, 1937 |
| 2,159,849 | Graemiger | May 23, 1939 |
| 2,171,535 | Berg et al. | Sept. 5, 1939 |
| 2,213,668 | Dundas et al. | Sept. 3, 1940 |
| 2,223,953 | Davis | Dec. 3, 1940 |
| 2,515,541 | Yellott | July 18, 1950 |
| 2,515,542 | Yellott | July 18, 1950 |
| 2,560,807 | Lobo | July 17, 1951 |
| 2,584,805 | Leftwich | Feb. 5, 1952 |

FOREIGN PATENTS

| | | |
|---|---|---|
| 18,329 | Great Britain | Aug. 24, 1904 |
| 163,797 | Great Britain | May 24, 1921 |
| 168,581 | Great Britain | 1922 |
| 271,899 | Great Britain | Aug. 18, 1927 |
| 595,947 | Great Britain | Dec. 23, 1947 |